United States Patent [19]
Tomari et al.

[11] Patent Number: 5,523,833
[45] Date of Patent: Jun. 4, 1996

[54] DELIVERY MEMBER AND APPARATUS MAKING USE OF THE SAME

[75] Inventors: Yoshiaki Tomari, Yokohama; Susumu Kadokura; Tomoaki Kato, both of Sagamihara; Tadanori Suto, Tokyo, all of Japan

[73] Assignee: Canon Kabushiki Kaisha, Tokyo, Japan

[21] Appl. No.: 957,820

[22] Filed: Oct. 8, 1992

[30] Foreign Application Priority Data

Oct. 9, 1991 [JP] Japan ..................... 3-289445

[51] Int. Cl.$^6$ ................. G03G 21/00; G01D 15/06
[52] U.S. Cl. ................. 355/309; 347/153; 358/300
[58] Field of Search ......................... 355/208, 245, 355/309, 308, 274, 271, 277, 212, 211, 275, 315; 347/30, 153; 358/300; 428/323, 327, 328, 403, 407, 457, 694 SL

[56] References Cited

U.S. PATENT DOCUMENTS

| | | | |
|---|---|---|---|
| 4,162,843 | 7/1979 | Inoue et al. | 355/274 X |
| 4,541,711 | 9/1985 | Takahashi | 355/208 |
| 4,933,723 | 6/1990 | Kakuta et al. | 355/271 |
| 5,038,178 | 8/1991 | Hosoya et al. | 355/277 |
| 5,138,343 | 8/1992 | Aichi et al. | 347/30 |
| 5,283,116 | 1/1994 | Tomari et al. | 428/323 |
| 5,404,154 | 4/1995 | Tomari et al. | 347/153 |

FOREIGN PATENT DOCUMENTS

| | | |
|---|---|---|
| 0256776 | 2/1988 | European Pat. Off. . |
| 0452880 | 10/1991 | European Pat. Off. . |
| 57-65765 | 4/1982 | Japan . |
| WO91/06499 | 5/1991 | WIPO . |

Primary Examiner—Arthur T. Grimley
Assistant Examiner—Shuk Y. Lee
Attorney, Agent, or Firm—Fitzpatrick, Cella, Harper & Scinto

[57] ABSTRACT

A delivery member has a substrate and, provided thereon, an eletro-deposition coating film containing an organic powder. By this configuration, a delivery member having a homogeneous coating is formed. Stress is therefore uniformly distributed and the coating is resistant to wear. The delivery member can be made in a variety of different forms and can be used in many different types of apparatus.

12 Claims, 7 Drawing Sheets

DELIVERY MEMBER AND APPARATUS MAKING USE OF THE SAME

BACKGROUND OF THE INVENTION

1. Field of the Invention

The present invention relates to a delivery member used in paper delivery in office automation machinery, printers and so forth. It also relates to an apparatus making use of such a delivery member.

2. Related Background Art

Apparatus such as electrophotographic apparatus, printers, facsimile apparatus and so forth have a delivery path through which image-receiving media such as recording paper and plastic sheets are delivered. The delivery path comprises roller-like, plate-like or belt-like delivery members.

The image-receiving media are delivered in contact with roller-like, plate-like or belt-like delivery members. Hence the delivery members are required to have a durability. In high-speed recording or color recording, image-receiving media must be delivered with good precision, and hence the delivery members are required to have homogeneous surfaces.

Conventional delivery members such as rollers are exemplified by the following.

(a) Those comprising a steel material having spray-coated thereon a coating solution in which fillers such as metal fine particles have been mixed.

(b) Those comprising a steel material whose surface is plated, thereafter covered with rubber and then coated with Teflon (trademark).

(c) Those comprising a steel material whose surface is made rough by sandblasting or using a laser and then is plated.

(d) Those comprising a steel material whose surface is plated and then coated with aluminum oxide by electrostatic spraying.

(e) Those comprising a steel material whose surface is plated and then subjected to composite plating to form a coating containing SiC or diamond dust.

However, with regard to the above (a), there is a limit in the simultaneous coating of a plurality of members by means of a set of coating robots when a high-grade surface uniformity is required as in the delivery members, if an automation line is adopted in the manufacturing process. Moreover, the state of surfaces of coatings becomes non-uniform because of diffusion of coating compositions to cause a great problem in both the mass productivity and the surface properties.

With regard to the above (b), there is the problem that changes with time as a result of repeated use bring about a deformation of rubber to lower outside diameter precision and cause faulty paper feed and output. This not only lowers the commercial value but also requires a prolonged process in its manufacture, lowers operating efficiency, and results in a high production cost. Thus, there is a great problem in its mass productivity.

With regard to the above (c), the delivery member tends to gather rust on its surface and hence requires a treatment for rust prevention, e.g., plating, carried out in a subsequent step for the purpose of protection from corrosion. In such an instance, the plating is carried out on the sandblasted surface, having a low outside diameter precision, so that the outside diameter precision is further lowered and also the number of manufacturing steps increases. Thus this member can not be mass-produced. In the case of the delivery member comprising a steel material whose surface is made rough using a laser to increase a coefficient of friction, only one member can be manufactured at one time when it is a roller or the like, and moreover it takes a long time for that treatment. Thus this member also can not be mass-produced.

With regard to the above (d), the delivery member can not be stable in the adhesion and uniformity of aluminum oxide and the final outside diameter precision. There is also a limit in the manufacture of uniform-quality goods in large quantities and at a low cost.

With regard to the above (e), there is the problem that impurities tend to be included in a composite plating bath to make the bath unstable and hence the bath can not be durable to repeated use. Moreover, there is a disadvantage of high cost in plating solutions and a problem of a poor uniform dispersibility, bringing about a great problem in manufacturing cost.

In many instances, it is necessary to impart conductivity to the delivery member. For example, conductive paper delivery members are used in copying machines or the like at their paper delivery paths, and resistivity is controlled at the paper delivery paths.

Namely, in the case when a paper delivery member that comes into contact with paper has insulation properties, the paper delivery member produces triboelectricity due to friction between paper and the member in an environment of low humidity, so that toner may adhere to the paper delivery member to soil the paper. In the case when a paper delivery member has a low resistivity, the paper itself comes to serve as a low-resistive element because of its moisture absorption in an environment of a high humidity, so that the charges produced may leak through a transfer guide to cause blank areas of images.

Under such circumstances, in conventional copying machines, as shown in FIG. 10, a delivery member (a guide) 14 comprised of a Ni-coated steel material is grounded through a voltage regulator (a varistor) 12 to have a middle voltage so that toner stains and blank areas caused by poor transfer can be prevented. This method, however, requires an increase in the number of component parts to bring about an increase in operational steps, and hence can not be mass-productive. In the drawing, reference numeral 9 denotes a photosensitive member; 10, toner; 11, a transfer medium; and 13, a transfer corona assembly.

SUMMARY OF THE INVENTION

The present invention was made in order to solve these problems involved in the prior art. An object of the present invention is to provide a delivery member having superior wear resistance and a good surface homogeniety, and also enabling easy control of its conductivity, and an apparatus making use of such a member.

The delivery member of the present invention comprises a substrate and, provided thereon, an electro-deposition coating film containing an organic powder.

The apparatus making use of the delivery member described above is an electrophotographic apparatus comprising a photosensitive member, a means for imagewise exposure, a means for developing a latent image formed by said means for imagewise exposure, a means for transferring the developed image to an image-receiving medium, and a delivery path through which said image-receiving medium is delivered; wherein a delivery member that constitutes said delivery path comprises a substrate and, provided thereon, an electro-deposition coating film containing an organic powder.

Another apparatus making use of the delivery member described above is an ink-jet recording apparatus comprising a recording head from which ink is caused to fly onto an image-receiving medium, and a roller on which said image-receiving medium is delivered; wherein said roller comprises a substrate and, provided thereon, an electro-deposition coating film containing an organic powder.

DESCRIPTION OF THE PREFERRED EMBODIMENTS

The delivery member of the present invention is used at the part through which image-receiving media such as recording paper or plastic sheets are moved in electrophotographic apparatus, printers or facsimile apparatus, and includes all the members with which the image-receiving media come into contact.

The delivery member of the present invention can be exemplified by a roller, a belt or a plate-like guide.

As shown in FIGS. 1 to 4, the delivery member of the present invention comprises a substrate 2 and provided thereon an electro-deposition coating film 1 containing an organic powder.. The image-receiving mediums being delivered come into contact with the electro-deposition coating film 1.

The electro-deposition coating film refers to a film formed by electro-deposition coating. The electro-deposition coating is a process in which a pair of electrodes are disposed in a solution prepared by dissolving a film-forming material (hereinafter "electro-deposition coating composition") and a direct voltage is applied to the-electrodes to deposit the material on one of the electrodes. Accordingly, when the delivery member of the present invention is produced, the substrate 2 is set as one of the electrodes. As the other electrode, for example, a stainless steel plate may be used.

As the substrate 2, for example, a metal such as aluminum, aluminum alloy, stainless steel or iron, or a heat-resistant plastic material such as polycarbonate resin, ABS, CF/ABS, modified PPE, modified PPO, and GF/PC can be used. When, however, the non-metallic material is used as the substrate 2, the substrate 2 must be subjected to conductivity-providing treatment before the electro-deposition coating is carried out. Depending on the properties of the substrate 2, it is also preferable to appropriately carry out subbing treatment before the electro-deposition coating.

Figure 1:
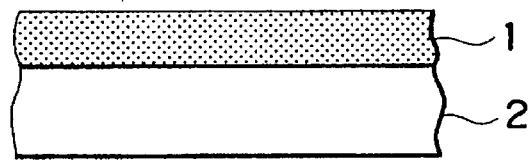
FIG. 1 is a partial cross section to show an example of the delivery member according to the present invention.

The delivery member shown in FIG. 1 comprises a metallic member 2 on the surface of which an electro-deposition coating film 1 has been directly formed.

Figure 2:
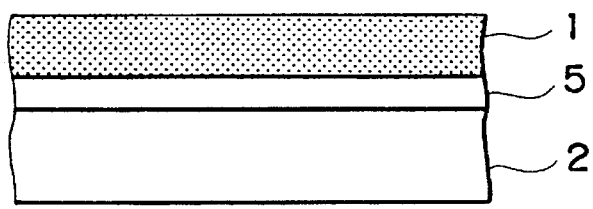
FIGS. 2 is a partial cross section to show another example of the delivery member according to the present invention.

The delivery member shown in FIG. 2 comprises a metallic member 2 on the surface of which an aluminum anodized coating sub-layer 5 has been formed for the purpose of improving adhesion, and on the aluminum anodized coating sub-layer 5 of which, the electro-deposition coating film 1 has been formed.

Figure 3:
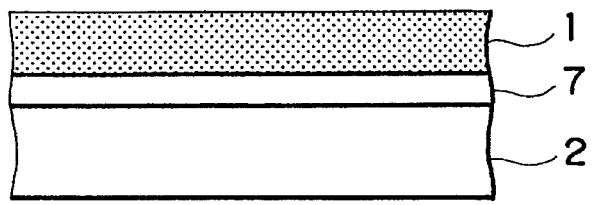
FIG. 3 is a partial cross section to show still another example of the delivery member according to the present invention.

The delivery member shown in FIG. 3 comprises a metallic member 2, on the surface of which a chemical conversion coating layer 7 has been formed for the purpose of protection from corrosion, and on the chemical conversion coating layer 7 of which the electro-deposition coating film 1 has been formed.

Figure 4:
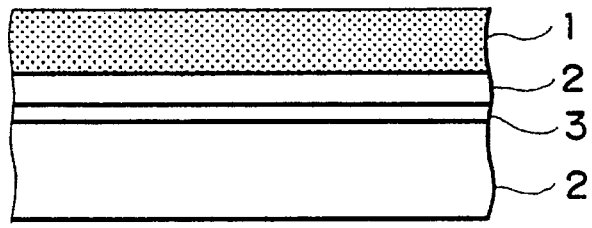
FIG. 4 is a partial cross section to show a further example of the delivery member according to the present invention.

The delivery member shown in FIG. 4 comprises a resin substrate 2, on the surface of which a sub-layer with a double layer structure comprised of a catalyst-treated layer 3 and a metal coating layer 2 have been formed, and on the metal coating layer 2 of which the electro-deposition coating film 1 has been formed.

The electro-deposition coating composition that provides the electro-deposition coating film 1 is prepared by incorporating an organic powder as a filler in a resin feasible for electro-deposition.

Various studies have been hitherto made on the resin used in the electro-deposition coating. In order for the resin to be electro-deposited, the resin must be chargeable when formed into the electro-deposition coating composition. Charged resin is attracted to the anode or cathode upon application of a direct voltage, and deposited on the electrode to form a film. The resin used in the present invention can be exemplified by acryl-melamine resins, acrylic resins, epoxy resins, urethane resins and alkid resins, which are conventionally used in electro-deposition coating.

The resin used in the present invention may be either anionic resin or cationic resin. From a practical viewpoint, a water-soluble resin or water-dispersible resin having a carboxyl group is preferred. A resin prepolymer having a carboxyl group can be dissolved or dispersed in water after it has been neutralized to ammonia or an organic amine.

In the electro-deposition coating composition, the resin should be in a concentration ranging from 5% to 20% by weight, and preferably from 7% to 15% by weight.

The electro-deposition coating composition used in the present invention may preferably be prepared by dissolving or dispersing the desired resin in water. The electro-deposition coating composition may further contain an organic solvent of an alcohol type or glycol ether type. The organic solvent may be in a content of several percent to obtain intended results.

There are no particular limitations on the materials for the organic powder contained in the electro-deposition coating film 1, so long as it is a powder made of an organic material. It may preferably include, for example, powder of fluorine resins, polystyrene resins, epoxy resins or acrylic resins. In particular, powder of polymethyl methacrylate is preferred. The organic powder used in the present invention may preferably have a melting temperature of from 80° to 200° C.

The organic powder used in the present invention may be an organic powder comprising organic particles whose surfaces are coated with a metal (hereinafter "metallized organic powder"). Use of the metallized organic powder as the filler can provide an electro-deposition coating film 1 having conductivity. The metal coating of the metallized organic powder may preferably be a coating of AG, Ni or Cu, and more preferably a coating with a double layer structure comprised of Ni and Au. In particular, from the viewpoint of cost, an electroless coating of Ni or Cu is preferred.

The organic powder may have a particle diameter of from 0.05 to 5.0 μm, and preferably from 0.05 to 3.0 μm, as average particle diameter. In the case of the metallized organic powder, the organic powder may preferably have an average particle diameter of from 0.1 to 5.0 μm, and preferably from 0.3 to 3.0 μm, having thereon a metal coating in a thickness of from 0.05 to 0.9 μm, and more preferably from 0.1 to 0.5 μm.

An organic powder with an excessively small average particle diameter can not bring about a satisfactory effect. On the other hand, an organic powder with an excessively large average particle diameter results in a decrease in film strength of the electro-deposition coating film. In the present invention, the average particle diameter of the organic powder is a value measured by a laser diffraction type particle size analyzer LS130 (manufactured by Coulter Counter Co.).

The organic powder has a smaller density than inorganic powder and metal powder, and hence can be better dispersed and settled in the electro-deposition coating composition. For example, aluminum particles and polymethyl methacrylate particles each having an average particle diameter of 0.4 μm have a bulk density of 0.9 g/cm$^3$ and 0.3 g/cm$^3$, respectively Thus, use of the organic powder brings about an improvement in stability of the electro-deposition coating composition, resulting in a homogeneous electro-deposition coating film.

Upon electro-deposition coating using an electro-deposition coating composition containing a powder, the powder is deposited in the film formed. This is presumably because resin molecules, which are adsorbed around powder particles in the electro-deposition coating composition, are attracted to an electrode and concurrently therewith the powder is moved together in the direction of the electrode.

The electro-deposition coating film 1 may preferably have an average thickness of not less than 5 μm, and more preferably from 7 to 30 μm. In the present invention, the average layer thickness is an average value of layer thicknesses measured on arbitary three points. The layer thickness is an average value measured at a measurement distance of 2 mm.

The sub-layer may preferably have an average layer thickness of from 0.5 to 30 μm.

The organic powder should preferably be contained in the electro-deposition coating composition in an amount of from 1 part to 30 parts by weight, and more preferably from 2 parts to 15 parts by weight, based on 100 parts by weight of the resin feasible for electro-deposition. Its addition in the amount within this range makes it possible for the electro-deposition coating film to have an excellent wear resistance over the whole coating film. An instance in which the organic powder is in an excessively small content can not bring about a satisfactory effect. On the other hand, an instance in which the organic powder is in an excessively large content results in a low adhesion to the substrate or sub-layer.

In the case when the electro-deposition coating film 1 is formed by electro-deposition coating, the substrate 2 is set as an electrode and is immersed in the electro-deposition coating composition together with the other electrode. The electro-deposition coating composition should be prepared by dispersing the resin and the organic powder in a ball mill for about 24 to 35 hours, and thereafter diluting the dispersion using desalting water so as to, give a solid matter concentration of preferably from 1 to 12% by weight, and more preferably from 2 to 8% by weight. In the case when an anionic resin is used as the resin, the substrate 2 may be set as the anode, and in the case when a cationic one is used, the substrate 2 is set as the cathode. The electro-deposition may preferably be carried out under conditions of a bath temperature of from 18° C. to 25° C., a hydrogen ion concentration of from pH 8 to pH 9, a direct current at an applied voltage of from 50 V to 200 V, a current density of from 0.5 to 3 A/dm$^2$ and a treatment time of from 3 minutes to 6 minutes.

After the electro-deposition coating, the substrate 2 is taken out of the electro-deposition coating composition and is washed with water, followed by water break. Then the electro-deposition coating is cured in an oven of 90° C. to 140° C. for 20 minutes to 180 minutes. Thus the formation of the electro-deposition coating film 1 is completed.

The electro-deposition coating film 1 containing the organic powder has an excellent wear resistance. It is presumed that the wear resistance obtained here is not attributable to the hardness of the organic powder deposited, but to the uniform dispersion of the organic powder in the electro-deposition coating composition, achieved by the use of the particles having a small specific gravity as in the organic powder, resulting in a uniform distribution of stress applied to the film surface, and thus the wear resistance has been improved.

Use examples of the delivery member according to the present invention will be described below with reference to FIGS. 5, 6 and 7.

Figure 5:
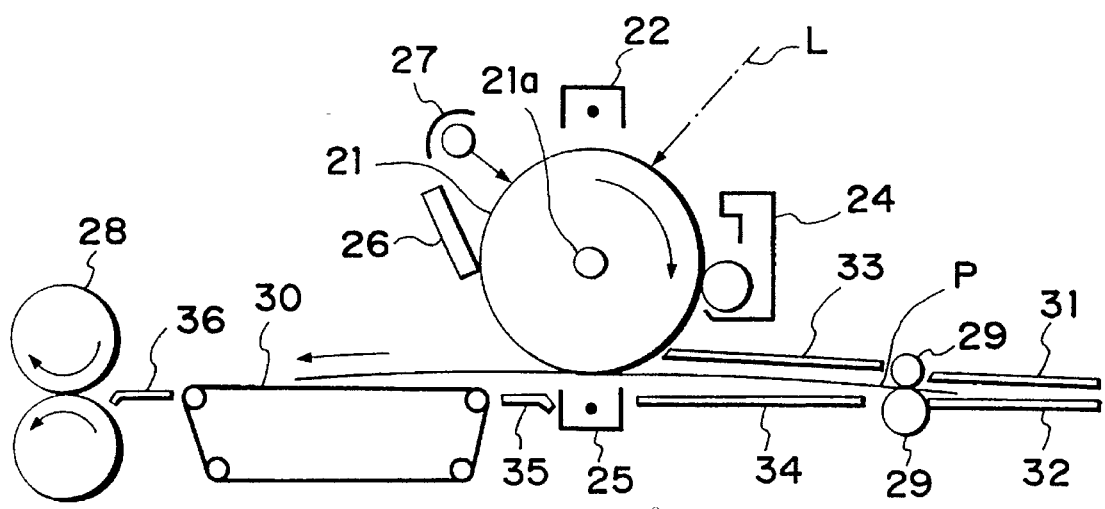
FIG. 5 is a side view to illustrate a transfer electrophotographic apparatus in which the delivery member of the present invention is used.

FIG. 5 schematically illustrates the constitution of a commonly available transfer electrophotographic apparatus in which a drum photosensitive member is used.

In FIG. 5, reference numeral 21 denotes a drum photosensitive member, which is rotated around a shaft 21a at a given peripheral speed in the direction shown by an arrow. In the course of rotation, the photosensitive member 21 is uniformly charged on its periphery, with positive or negative given potential by the operation of a charging means 22, and then imagewise exposed to light L (slit exposure, laser beam scanning exposure, etc.) at an exposure zone by the operation of an imagewise exposure means (not shown). As a result, an electrostatic latent image corresponding to the exposure image is formed on the periphery of the photosensitive member.

The electrostatic latent image thus formed is subsequently developed by toner by the operation of a developing means 24. The resulting toner image is then transferred to an image-receiving medium P such as paper. The image-receiving medium P is fed from a paper feed section (not shown), is delivered through a delivery path constituted of delivery guides 31, 32, a pair of resist delivery rollers 29 and delivery guides 33 and 34, and reaches the zone of a transfer means 25.

The image-receiving medium P on which the images have been transferred is delivered through a delivery path constituted of a delivery guide 35, a delivery belt 30 and a delivery guide 36, and reaches an image-fixing means 28, where the images are fixed by the image-fixing means 28. Thus, image formation is completed.

In the electrophotographic apparatus as shown in FIG. 5, the delivery member of the present invention can be applied to the delivery guides 31, 32, 33, 34, 35 and 36, the resist delivery rollers 29 and the delivery belt 30.

The surface of the photosensitive member 21 after the transfer of the image is brought to removal of the toner remaining after the transfer, using a cleaning means 26 and is further subjected to charge elimination by a pre-exposure means 27, and then repeatedly used for the formation of images.

In the case when the electrophotographic apparatus is used as a printer of a facsimile machine, the imagewise exposing light L is irradiated corresponding to received data. FIG. 6 illustrates an example of the principle of facsimile in the form of a block diagram.

Figure 6:
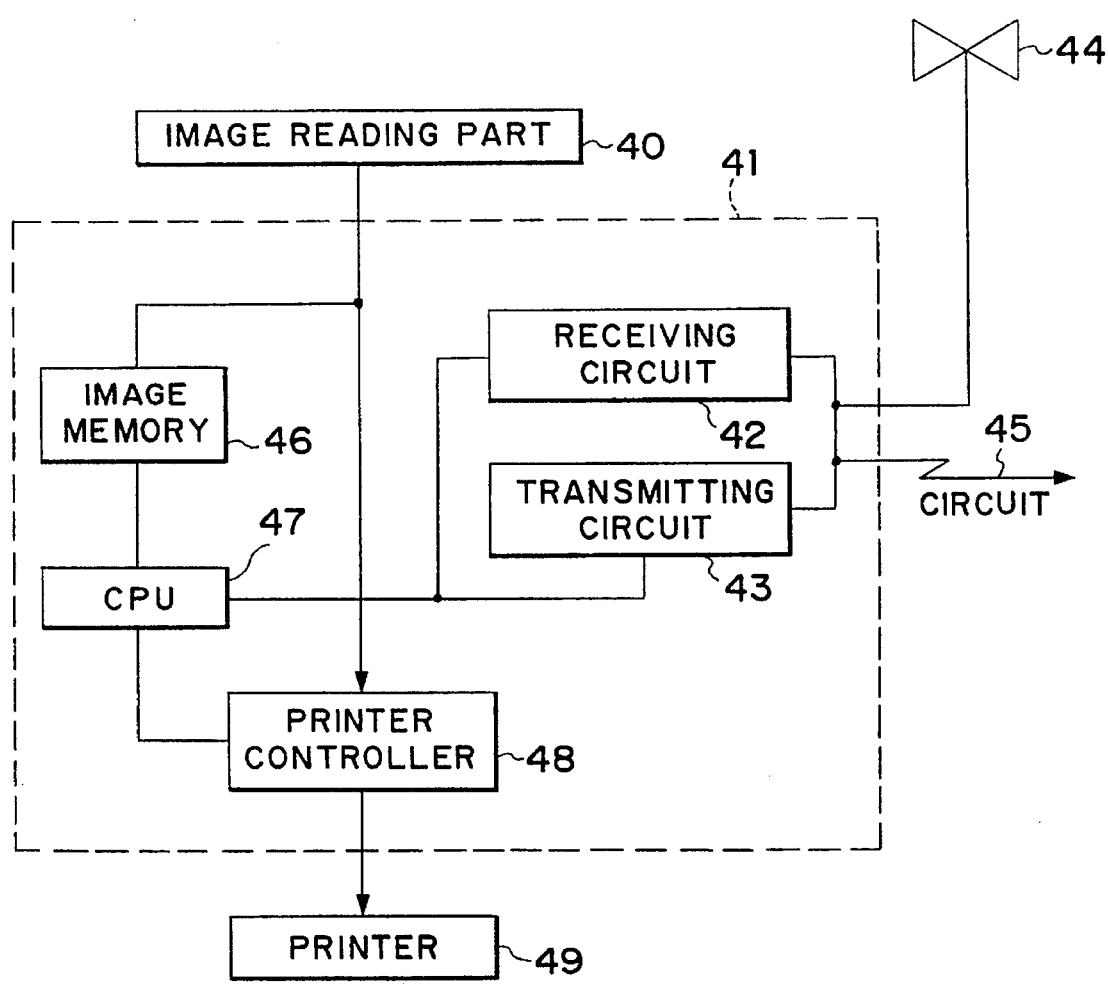
FIG. 6 is a block diagram of a facsimile system in which the above electrophotographic apparatus is used as a printer.

As shown in FIG. 6, a controller 41 controls an image reading part 40 and a printer 49. The whole of the controller 41 is controlled by CPU 47. Image data outputted from the image reading part 40 is sent to the other facsimile station through a transmitting circuit 43. Data received from the other station is sent to a printer 49 through a receiving circuit 42. Given image data are stored in an image memory 46. A printer controller 48 controls the printer 49. Reference numeral 44 denotes a telephone.

An image received from a circuit 45 (image information from a remote terminal connected through the circuit) is demodulated in the receiving circuit 42, and then successively stored in an image memory 46 after the image information is decoded by the CPU 47. Then, when images for at least one page have been stored in the memory 46, the image recording for that page is carried out. The CPU 47 reads out the image information for one page from the memory 46 and sends the coded image information for one page to the printer controller 48. The printer controller 48, having received the image information for one page from the CPU 47, controls the printer 49 so that the image information for one page is recorded.

The CPU 47 receives image information for the next page in the course of the recording by the printer 49.

Images are received and recorded in the way described above.

Figure 7:
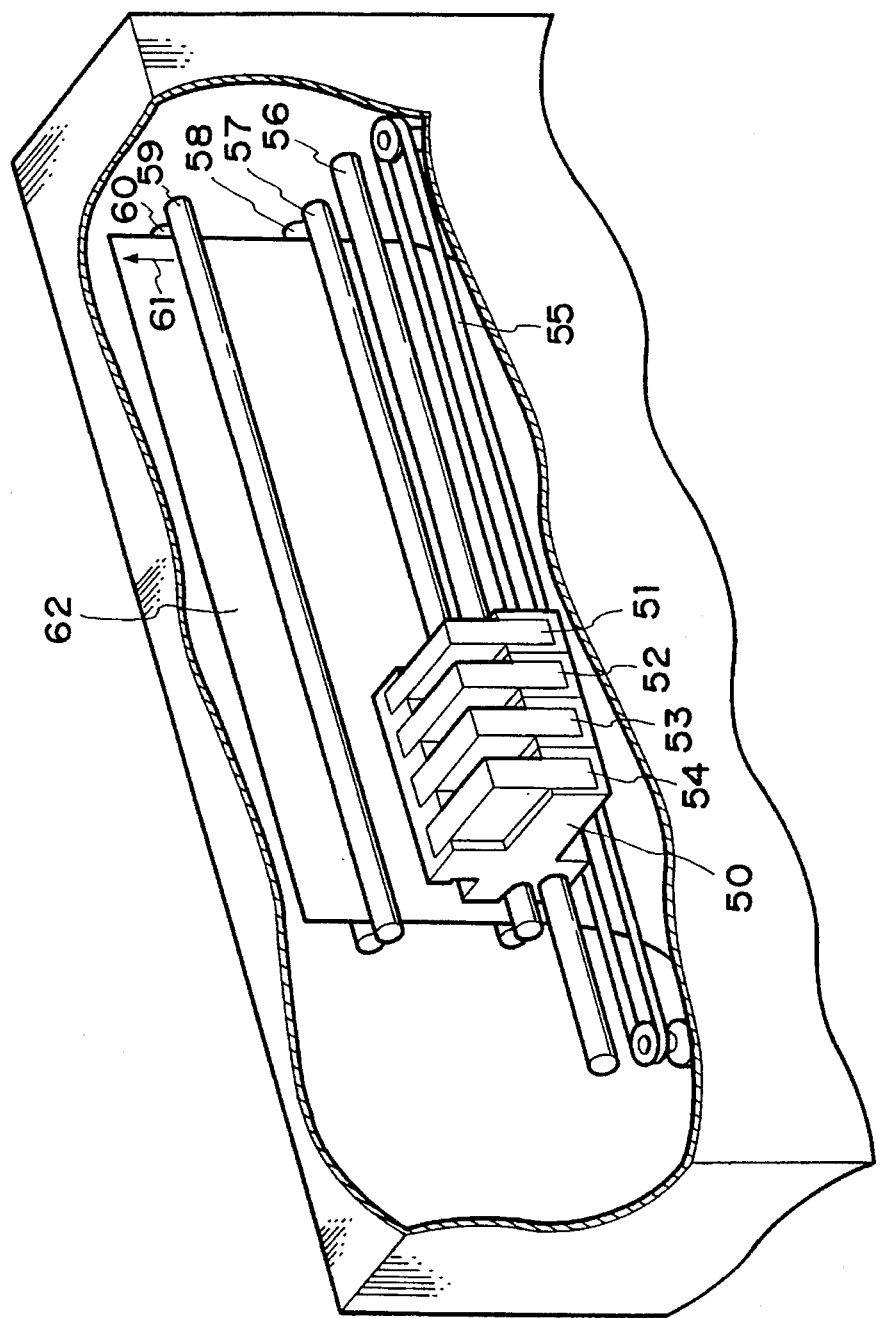
FIG. 7 is a perspective view to illustrate an ink-jet recording apparatus in which the delivery member according to the present invention is used.

FIG. 7 illustrates an ink-jet recording apparatus in which the delivery member of the present invention is used.

In FIG. 7, reference numeral 56 denotes a scanning rail that slidably supports a carriage 50; and 55, a belt that transmit a driving force for reciprocating the carriage 50. Reference numerals 59, 60 and 57, 58 denote pairs of rollers that hold an image-receiving medium 62 between them and deliver it through them. The delivery member of the present invention can be used in these rollers 57, 58, 59 and 60.

The carriage 50 is fitted with a plurality of cartridges 51, 52, 53 and 54. Each cartridge is integrally constituted of an ink container and a recording head from which ink is ejected and caused to fly. The recording head faces the image-receiving medium 62 being delivered in the direction of an arrow 61. A plurality of recording heads ape provided corresponding to inks with different color tones. The cartridges 51, 52, 53 and 54 eject inks of, for example, cyan, magenta, yellow and black colors, respectively, to cause them fly.

Results of durability tests on the rollers, the delivery members of the present invention are shown below. The durability tests were made on three kinds of rollers A, B and C as shown in Table 1. Two rollers were prepared for each kind, one of which was not used in the delivery to measured its coefficient of static friction and the other of which was used as the resist delivery roller 29 in the electrophotographic apparatus shown in FIG. 5. For the resist delivery roller 29 fitted to the electrophotographic apparatus, its coefficient of static friction was measured after 150,000 sheets of A4-size copy paper were delivered.

The rollers used in the durability tests were all comprised of an aluminum pipe on the periphery of which the electro-deposition coating film was formed in a thickness of 10 μm. The electro-deposition coating composition used for forming the electro-deposition coating film was of an anionic type in which the organic powder as shown in Table 1 was dispersed in 100 parts by weight of acrylic resin so as to be deposited in a quantity of from 1 part to 12 parts by weight (5 to 15 parts by weight in the case when the organic powder was comprised of the metallized organic powder). In the electro-deposition coating, the temperature was set to 20° to 25° C. After the electro-deposition coating was completed, the resulting coating was cured in a 100° C. oven for 60 minutes. The rollers each had an outer diameter of 30 mm and a length of 230 mm.

Figure 8:
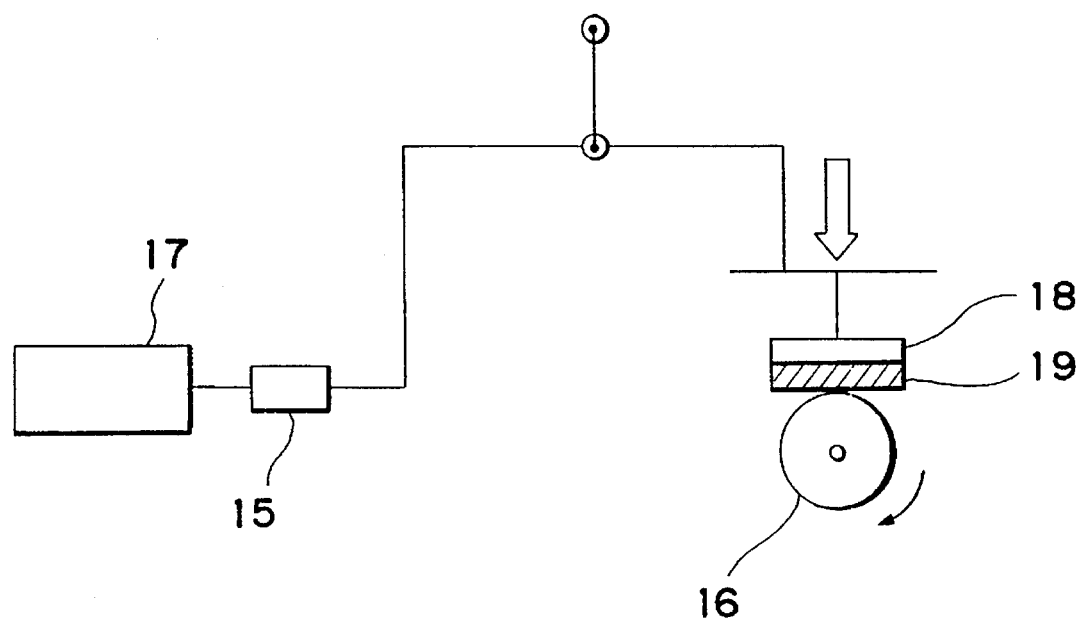
FIG. 8 is a side view to illustrate a surface properties testing device used in the measurement of coefficient of static friction.

The coefficient of static friction was measured in the following way: In the device shown in FIG. 8, the roller member was rotated in the direction of an arrow at an angular velocity ω of 1.5 rad/sec and a copy sheet 19 was brought into contact with the periphery of this roller 16. The copy sheet 19 was secured to a stationary plate 18 and a load of 1.5 kg was applied to the stationary plate 18 in the direction of the roller 16. Under such conditions the coefficient of static friction was measured using a sensor 15 and a recorder 17. The durability tests were made in the manner described above. Test results are shown in Table 1.

TABLE 1

| Organic powder | Organic powder average particle diameter (μ) | Coefficient of static friction before use | Coefficient of static friction after use | Delivery performance after running |
| --- | --- | --- | --- | --- |
| Roller A: PMMA | 0.4 | 1.7 | 1.3 | Good |
| Roller B: Fluorine resin: | 0.3 | 1.8 | 1.3 | Good |
| Roller A: PMMA with particle surfaces coated with 0.2 μm thick nickel | 0.6 | 1.9 | 1.4 | Good |

PMMA: Polymethyl methacrylate

As is clear from the above Table 1, all the rollers A, B and C were found to have a satisfactory durability. For comparison, a durability test was similarly made on a conventional roller comprising a steel material having been subjected to plating, thereafter covered with rubber, and further coated with Teflon (trade mark). As a result, faulty delivery occurred upon delivery of 100,000 sheets of copy paper.

Next, the relationship between the rate of addition of metallized organic powder in the electro-deposition coating composition and the volume resistivity of the electro-deposition coating film was examined.

The electro-deposition coating composition used was an acrylic resin coating composition. (concentration of acrylic resin: 13% by weight) to which the metallized organic powder had been added. The metallized organic powder used was a powder comprising a polymethyl methacrylate powder with an average particle diameter of 1.0 μm whose particle surfaces were coated with nickel in a thickness of 0.1 μm.

Using this electro-deposition coating composition, electro-deposition coating films of 20 μm in thickness were formed on one surface of square aluminum 53S test pieces of 5.0 cm in each side and 1.0 mm in thickness, and their volume resistivities were measured. The resistivities were measured by bringing a four-point probe into contact with the electro-deposition coating film in a measurement area of 1 cm$^2$.

Figure 9:
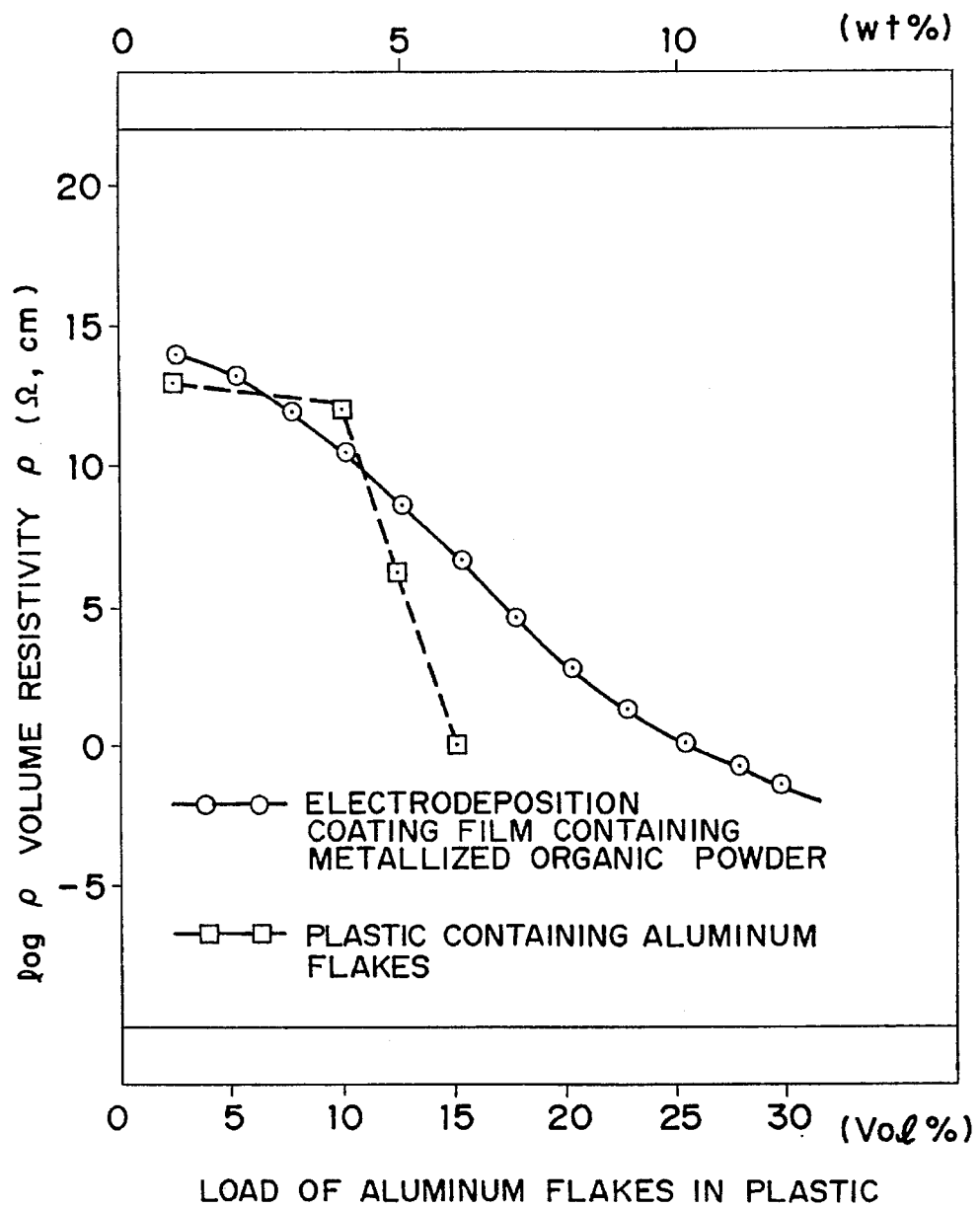
FIG. 9 is a graph to show values measured on the volume resistivities of an electro-deposition coating film containing an organic metal powder and a plastic loaded with aluminum flakes.

Results of measurement are shown in FIG. 9. FIG. 9 also shows the results obtained when the volume resistivities were measured on conductive plastics formed by mixing aluminum flakes (size: 1.0 mm×1.4 mm, 25 to 30 μm thick) into a plastic. The volume resistivities of plastics into which aluminum flakes were mixed were measured by the method described in "KOGYO ZAIRYO (Industrial Materials)", Nikkan Kogyo Shinbun Sha, Vol. 30, No. 10, p. 54.

Figure 10:
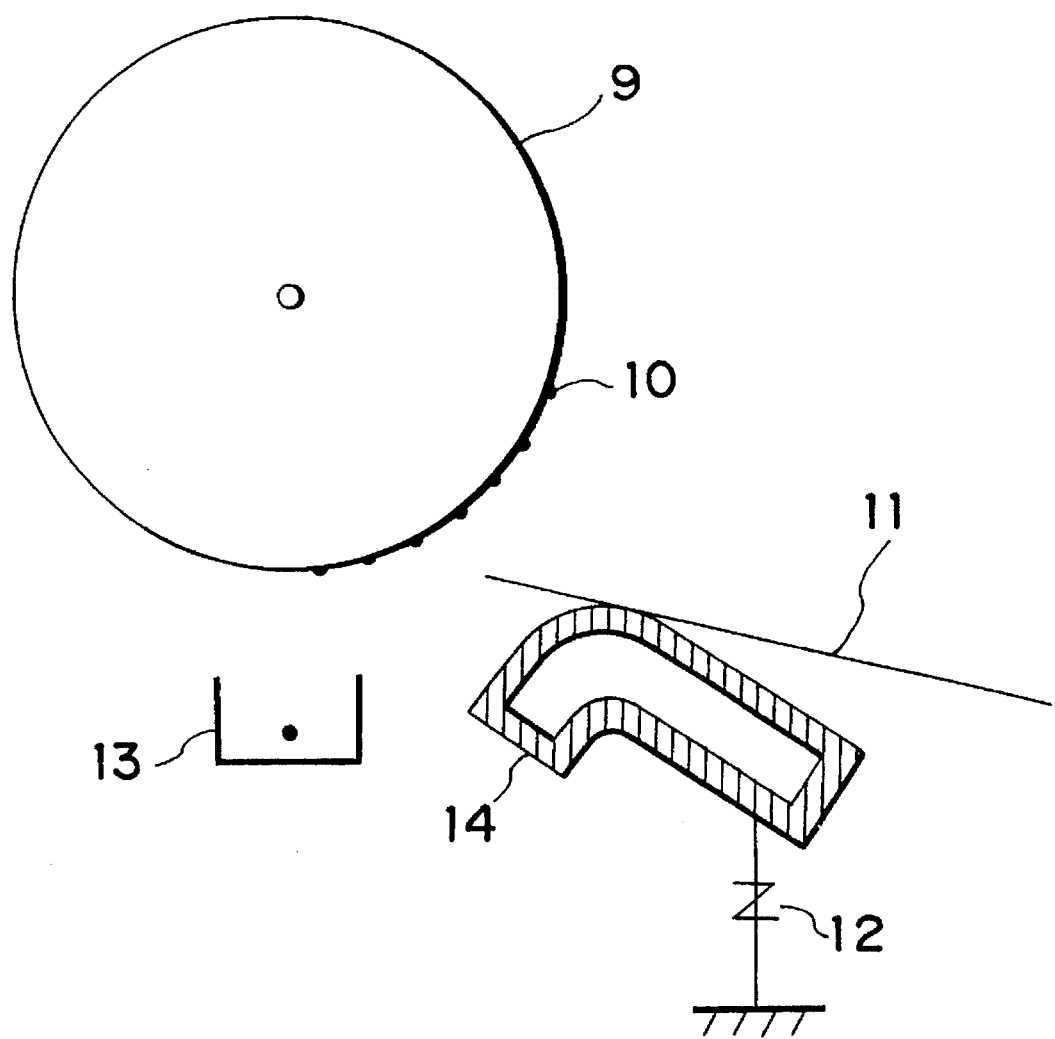
FIG. 10 is a partial side view to illustrate the part at which a transfer guide is used in an electrophotographic apparatus.

As is clear from FIG. 9, in the case of the plastics into which aluminum flakes were kneaded, an abrupt decrease in volume resistivity is seen with an increase in the load of aluminum flakes. On the other hand, the electro-deposition coating films formed by mixing the metallized organic powders show volume resistivities with mild changes, and hence it is possible to produce in a good precision, delivery members having any desired specific resistivities. Accordingly, use of the delivery member of the present invention in the transfer guide 14 which is the delivery member of the copying machine shown in FIG. 10 makes it possible to control the resistivity of the transfer guide 14 to an optimum value without use of any voltage regulator.

As described above, in the delivery member of the present invention, the coating film on its surface is formed by electro-deposition coating, and hence the filler is not localized. Thus a homogeneous electro-deposition coating film can be obtained. For this reason, the delivery member of the present invention can have a superior wear resistance. In addition, because of incorporation of the metallized organic powder, its resistivity can be controlled to an optimum value.

EXAMPLES

The present invention will be specifically described below by giving Examples.

Example 1

In 100 parts by weight of an acryl-melamine resin (trade name: Honey Bright CL-1; produced by Honey Chemical Co.), 2 parts by weight of polymethyl methacrylate organic powder with an average particle diameter of 0.4 μm was added and dispersed for 30 hours using a ball mill, and thereafter the dispersion was diluted with desalted water to 12% by weight as a concentration of solid contents to make up a coating composition.

Using this coating composition, an electro-deposition coating film was formed on the periphery of a subbed cylindrical substrate made of ABS resin. The resist delivery roller 29 as shown in FIG. 5 was thus produced.

The cylindrical substrate was in the size of an outer diameter of 30 mm, a length of 230 mm and a thickness of 1 mm.

The subbing of the cylindrical substrate was carried out in the following way: The cylindrical substrate made of ABS resin was treated with an etchant of a $CrO_3$—$H_2SO_4$—$H_2O$ system for 1 minute followed by catalytic treatment with palladium. Thereafter, nickel was applied by electroless plating in a thickness of 0.5 μm, followed by treatment with a solution of 0.01 g/lit. of chromic anhydride for 1 minute.

The electro-deposition coating was carried out at an applied voltage of 70 V for 3 minutes using the cylindrical substrate as the anode and a 0.5 mm thick stainless steel plate as the opposing electrode. At this time the electro-deposition coating composition had a temperature of 20° C. and a pH of 8. After the electro-deposition was completed, the cylindrical substrate on which a coating had been formed was washed with water and then put in an oven of 97° C.± 1° C. for 60 minutes to effect curing of the coating. The electro-deposition coating film thus formed had an average coating thickness of 15 μm.

On the resist delivery roller thus produced, the durability test previously described was made. As a result, the coefficient of static friction was in values as good as 1.3 to 1.4 even after 150,000 sheets of copy paper were delivered. The coefficient of static friction before delivery was 1.7.

Example 2

Using the electro-deposition coating composition of Example 1, an electro-deposition coating film was formed on the periphery of a subbed cylindrical substrate made of aluminum 53S. The resist delivery roller 29 as shown in FIG. 5 was thus produced. The cylindrical substrate was in the size of an outer diameter of 30 mm, a length of 230 mm and a thickness of 1 mm.

The subbing of the cylindrical substrate was carried out by anodizing. As a result of this treatment, an anodized aluminum coating of 3 μm thick was formed.

Electro-deposition was carried out in the same manner as in Example 1. After the electro-deposition was completed, the cylindrical substrate on which a coating had been formed was washed with water and then put in an oven of 120° C.±1° C. for 50 minutes to effect curing of the coating. The electro-deposition coating film thus formed had an average coating thickness of 13 μm.

On the resist delivery roller thus produced, the durability test previously described was made. As a result, the coefficient of static friction was in values as good as 1.3 to 1.4 even after 150,000 sheets of copy paper were delivered. The coefficient of static friction before delivery was 1.7.

Example 3

Example 1 was repeated to produce the resist delivery roller 29 as shown in FIG. 5, except that 2 parts by weight of the polymethyl methacrylate organic powder used therein was replaced with 5 parts by weight of fluorine resin organic powder (available from Daikin Industries, Ltd.) with an average particle diameter of 1.0 μm. The electro-deposition coating film thus formed had an average coating thickness of 15 μm.

On the resist delivery roller thus produced, the durability test previously described was made. As a result, the coefficient of static friction was in values as good as 1.4 to 1.5 even after 150,000 sheets of copy paper were delivered., The coefficient of static friction before delivery was 1.7 to 1.8.

Example 4

An electro-deposition coating composition was prepared in the same manner as in Example 1 except that 2 parts by weight of the polymethyl methacrylate organic powder used therein was replaced with 8 parts by weight of metallized organic powder comprising polymethyl methacrylate organic powder with an average particle diameter of 1.0 μm whose particle surfaces had been coated with nickel by electroless plating in a thickness of 0.1 μm.

Using the electro-deposition coating composition thus prepared, an electro-deposition coating film was formed on the peripheries of subbed plate-like substrates made of ABS resin, in the same manner as in Example 1. The delivery guides 34 and 36 as shown in FIG. 5 were thus produced. The electro-deposition coating films thus formed thereon each had an average coating thickness of 14 μm.

The delivery guides thus produced had volume resistivities of from $10^7$ to $10^9$ Ω·cm. These delivery guides were set in the electrophotographic apparatus as shown in FIG. 5 to take a copy 100,000 times. As a result, any soil due to adhesion of toner did not occur on copy paper even in an environment of a low humidity (25%RH). Any faulty operation such as blank areas in images also did not occur even in an environment of a high humidity (85%RH). Thus, good performances required as delivery guides were obtained in the both environments.

Example 5

An electro-deposition coating composition was prepared in the same manner as in Example 1 except that 2 parts by weight of the polymethyl methacrylate organic powder used therein was replaced with 9 parts by weight of metallized organic powder comprising polymethyl methacrylate organic powder with an average particle diameter of 0.4 μm whose particle surfaces had been coated with nickel by electroless plating in a thickness of 0.1 μm.

Using the electro-deposition coating composition thus prepared and using the same cylindrical substrate as used in Example 1, the resist delivery roller 29 as shown in FIG. 5 was produced in the same manner as in Example 1.

On the resist delivery roller thus produced, the durability test previously described was made. As a result, the coefficient of static friction was in values as good as 1.3 to 1.4 even after 150,000 sheets of copy paper were delivered. The coefficient of static friction before delivery was 1.8 to 1.9.

What is claimed is:

1. An electrophotographic apparatus comprising:

a photosensitive member;

exposure means for forming a latent image on said photosensitive member;

developing means for developing a latent image formed on said photosensitive member;

transfer means for transferring a developed image from said photosensitive member to an image-receiving medium; and a medium delivery path through which an image-receiving medium is delivered, said delivery path comprising a delivery roller having a substrate and an electro-deposition coating film containing an organic powder provided on said substrate, wherein said coating film is contactable with an image-receiving medium for delivering the image-receiving medium through said medium delivery path.

2. The electrophotographic apparatus according to claim 1, wherein said organic powder comprises material selected from the group consisting of a fluorine resin, a polystyrene resin, an epoxy resin and an acrylic resin.

3. The electrophotographic apparatus according to claim 1, wherein said organic powder comprises organic particles having surfaces coated with metal.

4. The electrophotographic apparatus according to claim 1, wherein said organic powder has an average particle diameter of from 0.05 μm to 5.0 μm.

5. The electrophotographic apparatus according to claim 4, wherein the average particle diameter is from 0.05 μm to 3.0 μm.

6. The electrophotographic apparatus according to claim 1, wherein said delivery path further comprises a plate-like delivery guide.

7. The electrophotographic apparatus according to claim 1, wherein said delivery path further comprises a delivery belt.

8. The electrophotographic apparatus according to claim 1, wherein said apparatus constitutes a printer in a facsimile apparatus.

9. An ink-jet recording apparatus comprising:

a recording head from which ink is caused to fly onto an image-receiving medium; and a roller for delivering an image-receiving medium to said recording head, said roller comprises a substrate and an electro-deposition coating film containing an organic powder provided on said substrate, wherein said coating film is contactable with an image-receiving medium for delivering the image-receiving medium to said recording head.

10. The ink jet recording apparatus according to claim 9, wherein said organic powder is made of a material selected from the group consisting of a fluorine resin, a polystyrene resin, an epoxy resin and an acrylic resin.

11. The ink jet recording apparatus according to claim 9, wherein said organic powder comprises organic particles whose surfaces has been coated with a metal.

12. The ink jet recording apparatus according to claim 9, wherein said organic powder has an average particle diameter of from 0.05 μm to 5.0 μm.

\* \* \* \* \*

UNITED STATES PATENT AND TRADEMARK OFFICE
CERTIFICATE OF CORRECTION

PATENT NO. : 5,523,833
DATED : June 4, 1996
INVENTOR(S) : YOSHIAKI TOMARI, ET AL.

Page 1 of 2

It is certified that error appears in the above-indentified patent and that said Letters Patent is hereby corrected as shown below:

Column 1

Line 28, "having" should read --and having--.

Column 2

Line 46, "productive." should read --produced.--; and
Line 54, "homogeniety," should read --homogeneity,--.

Column 5

Line 13, "AG," should read --Ag,--; and
Line 42, "respectively" should read --respectively.--.

Column 8

Line 5, "them fly." should read --them to fly.--; and
Line 10, "measured" should read --measure--.

UNITED STATES PATENT AND TRADEMARK OFFICE
CERTIFICATE OF CORRECTION

PATENT NO. : 5,523,833

DATED : June 4, 1996

INVENTOR(S) : YOSHIAKI TOMARI, ET AL.

It is certified that error appears in the above-indentified patent and that said Letters Patent is hereby corrected as shown below:

<u>Column 10</u>

Line 4, "Was" should read --was--.

<u>Column 12</u>

Line 55, "has" should read --have--.

Signed and Sealed this

Twenty-ninth Day of October 1996

Attest:

BRUCE LEHMAN

*Attesting Officer*     *Commissioner of Patents and Trademarks*